United States Patent [19]

MacDiarmid et al.

[11] Patent Number: 5,519,111
[45] Date of Patent: May 21, 1996

[54] HIGH MOLECULAR WEIGHT POLYANILINES AND SYNTHETIC METHODS THEREFOR

[75] Inventors: Alan G. MacDiarmid, Drexel Hill, Pa.; Sanjeev K. Manohar, Cincinnati, Ohio; Luis H. C. Mattoso, San Carlos, Brazil

[73] Assignee: The Trustees of the University of Pennsylvania, Philadelphia, Pa.

[21] Appl. No.: 232,236

[22] PCT Filed: Nov. 6, 1992

[86] PCT No.: PCT/US92/09709

§ 371 Date: Nov. 15, 1994

§ 102(e) Date: Nov. 15, 1994

[87] PCT Pub. No.: WO93/09175

PCT Pub. Date: May 13, 1993

Related U.S. Application Data

[63] Continuation-in-part of Ser. No. 789,095, Nov. 7, 1991, Pat. No. 5,276,112.

[51] Int. Cl.[6] ............................................. C08G 73/00
[52] U.S. Cl. ........................... 528/422; 525/540; 252/500
[58] Field of Search ........................... 525/540; 528/422; 252/500

[56] References Cited

U.S. PATENT DOCUMENTS

| | | | |
|---|---|---|---|
| 4,204,216 | 5/1980 | Heeger et al. | 357/8 |
| 4,222,903 | 9/1980 | Heeger et al. | 252/518 |
| 4,321,114 | 3/1982 | MacDiarmid et al. | 204/2.1 |
| 4,442,187 | 4/1984 | MacDiarmid et al. | 429/213 |
| 5,008,041 | 4/1991 | Cameron | 252/500 |
| 5,135,682 | 8/1992 | Cohen et al. | 252/500 |
| 5,147,913 | 9/1992 | MacDiarmid et al. | 524/104 |
| 5,160,457 | 11/1992 | Elsenbaumer | 252/500 |
| 5,177,187 | 1/1993 | MacDiarmid et al. | 528/422 |

FOREIGN PATENT DOCUMENTS

| | | |
|---|---|---|
| WO90/08808 | 8/0990 | WIPO . |
| WO90/10297 | 9/1990 | WIPO . |

OTHER PUBLICATIONS

Masso Abe., et al., *Soluble and High Molecular Weight Polyanillines*, J. Chem. Soc., Chem. Commun., 1989 pp. 1736–1738.

B. K. Annis and A. H. Narten, *A Covalent Bond to Bromine in HBr–Treated Polyaniline from X–Ray Diffraction*, Synthetic Metals, 22, 1988, 191–199.

A. L. Horvath, BSC., MSc. *Handbook of Aqueous Electrolyte Solutions*.

Manohar and MacDiarmid, *Polyaniline: Pernigraniline, An Insoluble Intermediate in the Conventional Chemical Synthesis of Emeraldine*, Synthetic Metals, 41–43, 711–714 1991.

*Primary Examiner*—Mark Nagumo
*Attorney, Agent, or Firm*—Woodcock Washburn Kurtz Mackiewicz & Norris

[57] ABSTRACT

High molecular weight polyanilines are provided, alone with synthetic methods therefor. The methods generally comprise mixing aniline, protonic acid, salt, and a polymerization agent at the desired reaction temperature. The presence or the salt increases the molecular weight of the polyaniline produced. The reaction temperature is preferably maintained at lower temperatures to also increase the molecular weight of the polyaniline.

17 Claims, 1 Drawing Sheet

5,519,111

HIGH MOLECULAR WEIGHT POLYANILINES AND SYNTHETIC METHODS THEREFOR

GOVERNMENT SUPPORT

Portions of this invention were supported by Department of Defense Grant N00014-90-J-1559.

RELATED APPLICATION

This application is a continuation-in-part of U.S. application Ser. No. 07/789,095, filed Nov. 7, 1991, now U.S. Pat. No. 5,276,112.

FIELD OF THE INVENTION

This invention relates to polymers of aniline. More specifically, the invention relates to high molecular weight aniline polymers produced at relatively low reaction temperatures and at low concentrations of aniline species in solution. The invention also relates to articles fabricated from the inventive high molecular weight polymers.

BACKGROUND OF THE INVENTION

Much attention has recently been directed to polyaniline, due in large part to its excellent stability and the relatively high levels of electrical conductivity of certain of its structural forms. For example, one form of polyaniline known as "emeraldine base" or "polyaniline base" (structure (1), Y=0.5) can be protonated (doped) by dilute aqueous protonic acid such as hydrochloric acid to produce the corresponding salt (structure (2), A=Cl). This salt exhibits conductivities of about 1–5 Siemans per centimeter (S/cm) as a compressed powder pellet.

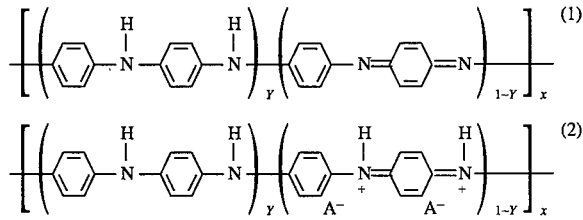

Polyaniline polymers can be processed into a variety of useful shaped articles such as fibers, films, and composites thereof. For many such applications, there is a positive correlation between increased molecular weight for the polyaniline employed and the performance properties of the resultant shaped article. Considerable attention has therefore been devoted to the development of polyanilines having high molecular weight. For example, M. Abe, et al., *J. Chem. Soc., Chem. Commun.*, 1736–39 (1989), reported that polymerization of aniline at −3° C. to −5° C. produced polyaniline having a weight average molecular weight of 160,000 as measured by gel permeation chromatography (GPC) using a polystyrene standard and a 0.01 mol/dm$^3$ LiBr/NMP solution as eluent. Abe, et al. observed that the molecular weight of polyaniline increases as its polymerization temperature decreases and hypothesized that the suppression of side reactions by lowering the polymerization temperature contributed to the increase in molecular weight.

Polyaniline polymers used to form shaped articles should have relatively low polydispersity, which is defined as the ratio of weight average molecular weight to number average molecular weight (i.e., $M_w/M_n$). As will be recognized, polydispersity, in conjunction with molecular weight, has a pronounced effect on properties such as melt viscosity, tensile strength, modulus, impact strength (toughness), and resistance to heat and corrosives. Lower polydispersity values generally indicate more controlled polymerization processes and higher quality polymers.

The solubility of the polyaniline is also an important processing consideration. Crosslinking a low molecular weight polyaniline to increase its molecular weight may render the polymer relatively insoluble in most known solvent systems and, hence, unusable from a manufacturing standpoint.

It would therefore be of great advantage to provide high molecular weight polyanilines of low polydispersity which are readily soluble in a variety of solvents.

OBJECTS OF THE INVENTION

Accordingly, it is one object of the present invention to provide high molecular weight polyanilines.

It is another object of the invention to provide high molecular weight polyanilines which can be efficiently elaborated into shaped articles.

It is yet another object of the invention to provide simple, reproducible methods for synthesizing high molecular weight polyanilines.

It is a further object to provide synthetic methods for producing polyaniline which involve polymerizing aniline at lower temperatures and at lower concentrations of aniline species in solution than those heretofore known in the art.

It is also an object of the invention to provide synthetic methods which involve polymerizing aniline in the presence of salts to provide high molecular weight polyaniline.

SUMMARY OF THE INVENTION

These and other objects are satisfied by the present invention, which provides high molecular weight polyanilines, along with preparative methods therefor. The methods generally comprise mixing aniline, protonic acid, salt, and a polymerization initiator in aqueous media and then recovering the resultant product from the mixture. The incorporation of the salt provides for the production of high molecular weight polyaniline. In a certain embodiment, the temperature of the aqueous media is maintained at below about −10° C. which produces polyanilines having weight average molecular weights greater than about 200,000. Significantly, incorporation of the salt appears to permit maintenance of the reaction mixture in a fluid state at very low temperatures without disrupting or otherwise interfering with the polymerization reaction.

The high molecular weight polyanilines of the invention have relatively low polydispersity—as indicated by single-peak gel permeation chromatograms—and, thus, possess a more uniform molecular weight distribution than polyanilines disclosed by the prior art. The polyanilines of the invention are soluble in a number of solvents such as N-methylpyrrolidinone, dimethylsulfoxide, concentrated sulfuric acid, and aqueous acetic acid, and can be readily processed into a wide variety of shaped articles.

DESCRIPTION OF THE PREFERRED EMBODIMENTS

Figure 1:
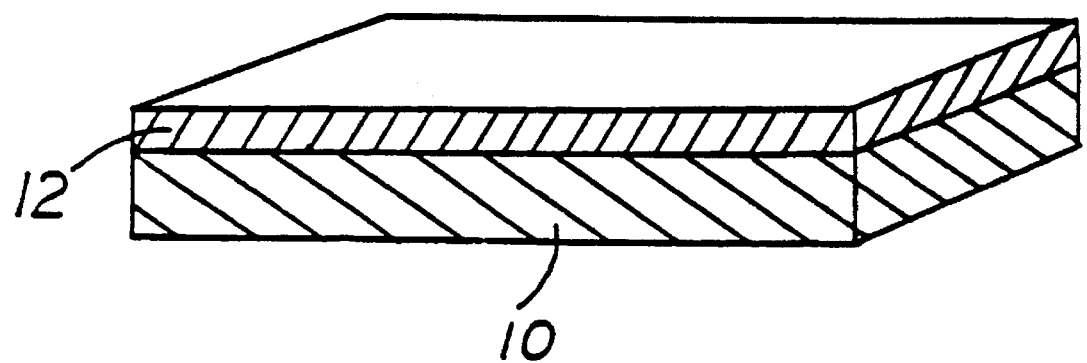
FIG. 1 represents a composite article comprising substrate coated with composition in accordance with this invention.

The high molecular weight polyanilines of the present invention are preferably prepared by mixing a first solution comprising aniline, protonic acid, and salt with a second solution comprising protonic acid, salt, and at least one compound effective to initiate polymerization of the aniline. The term "aniline" as used herein is intended to include compounds represented by formula (3):

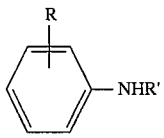
(3)

wherein R and R' are, independently, H, alkyl or alkoxyl having from about 1 to about 6 carbon atoms. In one preferred embodiment, R is 2-ethoxy. The term "polyaniline" as used herein is intended to encompass the polymers produced upon the polymerization of the compounds having formula (3), including N-substituted derivatives thereof having alkyl or other organic functional groups attached to one or more nitrogens of a polyaniline chain.

Protonic acids according to the present invention have the general formula $H_xA_y$, wherein x and y are each 1–8, H is hydrogen, and A is an anionic moiety such as, for example, $Cl^-$, $Br^-$, $I^-$, $SO_4^-$, $PO_3^-$, $SO_4^{2-}$, $PO_3^{3-}$, $ClO_4^-$, or $CH_3CO_3^-$. Useful anionic moieties further include: polymeric anions such as polystyrene or polyvinylsulfonate; thermally stable anions such as benzene sulfonate, $H(B_{12}H_{12})^-$ or p-toluene sulfonate; and long chain fatty acids such as dodecyl sulfonate. Preferred protonic acids include hydrochloric acid, hydrobromic acid, hydroiodic acid, sulfuric acid, and combinations thereof; hydrochloric acid is particularly preferred. Hydrobromic acid and hydroiodic acid are somewhat less preferred to the extent that they may provide aromatically halogenated products.

Salts according to the invention include any reaction product of acid and base having the general formula $M_xB_y$ wherein x and y are each 1–8 and M is a cationic moiety such as, for example, $Na^+$, $Li^+$, $K^+$, $Mg^{2+}$, $Cu^{2+}$, $(NH_4)^+$, or $Ca^{2+}$, and B is an anionic moiety such as, for example, $Cl^-$, $NO_3^-$, $Br^-$, $I^-$, $HSO_4^-$, $PO_4^{3-}$, $SO_4^{2-}$ or $CH_3CO_2^-$. The salt, as defined herein, is provided in the reaction mixture in addition to the polymerization agent. Representative salts include lithium chloride, lithium bromide, lithium iodide, sodium chloride, sodium bromide, sodium iodide, potassium chloride, potassium bromide, potassium iodide, potassium fluoride, ammonium sulfate, and combinations thereof. Lithium chloride, sodium chloride, calcium chloride, ammonium sulfate and mixtures thereof are preferred; metal salts are more preferred; lithium chloride alone is even more preferred. In a preferred embodiment of the invention, the salt and protonic acid are chosen such that they contain a common anionic moiety.

As will be recognized, the amount of the salt employed will vary depending upon the temperature at which the reaction mixture is to be maintained, with more salt generally being required for lower temperatures. At a minimum, the amount of salt should be effective to maintain the reaction mixture in a substantially fluid, non-frozen state at the desired temperature. It has been found that fluid reaction mixtures can be maintained at salt concentrations below about 10 moles/liter, preferably about 1–6 moles/liter.

Polymerization agents according to the invention are known per se as chemical compounds capable of causing polymerization of aniline in either a stoichiometric or non-stoichiometric manner. Representative polymerization agents include ammonium persulfate, $K_2Cr_2O_7$, $KIO_3$, $KMnO_4$, $H_2O_2$, $CuClO_4$, and oxidized polyaniline. Ammonium persulfate $((NH_4)_2S_2O_8)$ is particularly preferred.

Certain methods for producing polyaniline in accordance with the present invention require contacting aniline, protonic acid, salt, and polymerization agent in liquid, aqueous media at the selected reaction temperature. The reaction temperature is generally at or below about ambient (22° C.), preferably below about 10° C., and more preferably between about –10° C. and about 5° C., although above ambient conditions can also be employed for the synthesis.

Increasing the concentration of the salt in the reaction solution has been found to increase the molecular weight of the polyaniline at a given reaction temperature in a roughly linear fashion up to a maximum molecular weight value. The molecular weight then decreases at higher salt concentrations. Although not wishing to be bound to any theory of invention, it is believed that the presence of the salt increases the molecular weight by inhibiting the initiation step of the polymerization reaction, thus leaving the aniline species available to react with precipitated polymer chains; at higher salt concentrations the decrease in molecular weight is thought to be due to an increase in the viscosity of the reaction mixture. Generally, the concentration of salt in the reaction mixture is below about 10 moles/liter, preferably from about 1–8 moles/liter, more preferably from about 1–6 moles/liter, and even more preferably from about 3–6 moles/liter.

In a preferred embodiment, aniline, protonic acid, salt, and polymerization agent are mixed in liquid, aqueous media at a temperature below –10° C., preferably between about –10° C. and about –70° C., more preferably between about –20° C. and about –60° C., even more preferably between about –30° C. and about –40° C. It is preferred that each component be maintained at or about the mixing temperature prior to actual mixing. Such low temperatures can be maintained by any of the cooling techniques known in the art. The particular cooling method employed typically is dictated by functional and/or economic factors such as the size of the reaction vessel and the relative cost of a given cooling technique. For example, in certain embodiments, the first solution, the second solution, and the reaction mixture are maintained at temperatures below –10° C. using a cooling bath of dry ice and an organic solvent such as acetone. Dry ice, preferably particulate dry ice of relatively high purity, also can be admixed with the reaction mixture without significantly affecting the resultant polyaniline product.

The reaction is allowed to proceed for a time sufficient to produce high molecular weight polyaniline. Polymerization can be monitored by placing a platinum electrode and a SCE reference electrode in the reaction vessel and measuring changes in potential. Plotting time vs. potential generally shows a characteristic initial peak potential followed by a gradual decrease to an essentially constant and final value. The reaction preferably is terminated when the potential reaches this final value. Typically, the termination values for unsubstituted polyaniline and o-methoxypolyaniline are about 0.43 V and 0.34 V, respectively; the value for other alkoxypolyanilines can be readily determined by routine experimentation. The reaction time is generally from about 1 to 60 hours, preferably from about 1 about 48 hours.

The polyaniline precipitate which is formed upon mixing typically is collected and washed with protonic acid and/or organic solvent to provide a salt having, for example, formula (4), where A is an anionic species and Y is from 0 to 1. The preferred washing solution is one which will not decrease the molecular weight of the polyaniline product. Thus such solutions containing acetone are preferred over solutions containing HCl. It will be appreciated that the exact formula of the polyaniline product will depend upon the particular starting materials and reaction conditions employed.

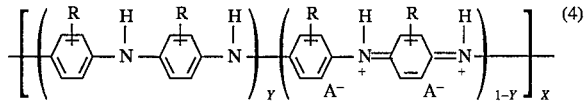

Polyaniline salts of formula (4) can be converted to bases having formula (5) by treatment with aqueous base comprising, for example, ammonium hydroxide. The resulting polyaniline base can then be recovered by known techniques such as washing with aqueous base and organic solvents followed by vacuum drying.

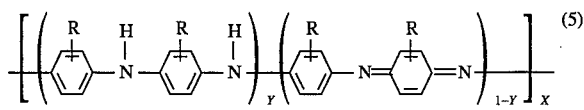

As will be recognized, it is difficult to precisely characterize polyanilines. For example, the exact position of the protonated nitrogens in the polyaniline backbone cannot be unequivocally assigned; resonance structures may be significant. It is preferred that the polyaniline salts and polyaniline bases of the present invention be generally in accordance with structures (4) or (5), respectively. It is also preferred that Y be between about 0.4 to about 0.6, as determined by titration of the polymer salt with titanium trichloride. It is particularly preferred that Y be about 0.5, as it is known that unsubstituted polyanilines wherein Y is about 0.5 exhibit greater conductivity than such polymers having different Y values.

While not wishing to be bound to any particular theory, it is believed that high, relatively narrowly distributed polyaniline molecular weights are achieved in accordance with the present invention by maintaining a relatively low solution concentration of anilinium ion and, thereby, free aniline. Since anilinium ions are believed to be the sites for polyaniline chain growth, decreased anilinium ion concentration should result in a reduced number of nucleation sites for polymer growth and, therefore, in polymers of higher molecular weight. Decreased anilinium ion concentration likely is effected in the present invention by the dual effects of temperature and ionic strength upon dissociation of the anilinium salts initially formed by adding aniline to acidic media. As illustrated in Equation (1), the anilinium hydrochloride, [(C$_6$H$_5$NH$_3$)$^+$Cl$^-$], likely formed by adding aniline to hydrochloric acid exists in equilibrium with anilinium ion, [C$_6$H$_5$NH$_3$]$^+$, and chloride ion (Cl$^-$).

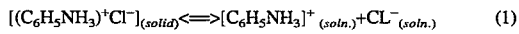

The anilinium hydrochloride precipitates out of solution at about −9° C. By adding salt, a reaction solution can be maintained at lower temperatures. The relatively low temperatures required by the present invention likely discourage dissociation of anilinium hydrochloride to anilinium ion. Increased chloride ion concentrations resulting from the addition of salts such as lithium chloride likely would also drive the equilibrium of Equation (1) away from anilinium ion formation in solution. Sulfuric acid is believed to be a preferred protonic acid, due to the generally low solubility of its anilinium salts. For example, the solubility of C$_6$H$_5$NH$_2$*H$_2$SO$_4$ in water at 15° C. is 6.6 g/100 ml, whereas the solubility of C$_6$H$_5$NH$_2$*HCl is 18 g/100 ml. The use of ammonium sulfate ((NH$_4$)SO$_4$; solubility=about 70 g/100 ml water at 0° C.) at high concentrations during polymerization is preferred, in that ammonium sulfate is believed to reduce the concentration of anilinium ion in solution by the common ion effect.

The polyaniline polymers of the present invention possess relatively high molecular weights, typically above 100,000 and generally above 200,000. It is particularly preferred that they have weight average molecular weights of from about 200,000 to about 440,000, more preferably from about 250,000 to about 440,000 and most preferably from about 300,000 to about 440,000.

As will be recognized, the molecular weight of a polyaniline base of the present invention will be approximately the same as its corresponding salt. Polyaniline molecular weight may be determined by various techniques well-known in the art. Typically, the molecular weight of a polyaniline salt is determined by conversion to the corresponding base. It is preferred that the molecular weight be determined by gel permeation chromatography (GPC), narrow polystyrene standard calibration, using an amide solvent such as N-methylpyrrolidinone (NMP) or dimethylformamide (DMF) in about a 0.5% LiCl solution as eluent; eluents containing NMP are preferred. The eluent preferably includes LiCl to ensure complete dissolution of the polyaniline.

The molecular weight of the polyaniline product can also be affected by the initial concentration of the reactants. For example, it has been found that the molar ratio of ammonium peroxydisulfate (initiator) to aniline monomer should be from about 1:4 to about 1:5, and that the molar ratio of peroxydisulfate to HCl (protonic acid) be about 1:10. Maintaining the molar ratio of ammonium peroxydisulfate to aniline monomer constant while diluting their concentration in the HCl appears to increase the molecular weight of the resulting polymer. The dilution is generally by a factor of from 2 to 8, and preferably by a factor of about 4. Thus, in a preferred embodiment of the present invention the molar ratio of the initiator to aniline is from about 1:1 to about 1:5, more preferably from about 1:4 to about 1:5, and the molar ratio of initiator to protonic acid is from about 1:10 to about 1:40.

The polyanilines of the present invention generally have low polydispersity and, thus, exhibit relatively narrow, single-peak gel permeation chromatograms, polydispersity. As will be recognized, polydispersity for a polymer is the ratio of its weight average molecular weight to its number average molecular weight (i.e., $M_w/M_n$). Polydispersity, in conjunction with molecular weight, has a pronounced effect on properties such as melt viscosity, tensile strength, modulus, impact strength (toughness), and resistance to heat and corrosives. Lower polydispersity values generally are indicative of more controlled polymerization processes and higher quality polymers. The polydispersity values of the present polyanilines generally are from about 2 to about 4, preferably from about 3 to about 4, more preferably from about 3 to about 3.7.

Aqueous solutions of poly(2-alkoxy)aniline salts are obtained by first wetting one or more of the salts with a dipolar aprotic solvent which is miscible with water, such as acetone, acetonitrile, methanol, tetrahydrofuran, dimethylformamide, NMP, or dimethylsulfoxide (DMSO) as disclosed in co-pending application Ser. No. 479,385, filed Feb. 13, 1990, now abandoned, entitled High Molecular Weight Alkoxyaniline Polymers and Articles Made Therefrom, which is incorporated herein by reference. It is preferred that the salt be wetted with either acetone or acetonitrile. Next, the salt is dissolved in water, preferably distilled water, or some other aqueous system. The polyaniline bases generally are soluble in such solvents as NMP, DMSO, sulfuric acid, and halogenated alkyl solvents having from about 1 to about 6 carbon atoms, such as methylene chloride, chloroform, and carbon tetrachloride.

Aqueous solutions of polyaniline can easily be processed into shaped articles such as films and fibers. Methods for processing polymer solutions into films and fibers are well known in the art. For example, films may be made by spreading a viscous solution of the polyaniline onto a polished surface and removing solvent from the film, e.g., by evaporation. FIG. 1 shows one such film 12, which has been formed upon surface 10.

Of special interest are fibers made from the high molecular weight polyaniline bases of this invention. Such fibers generally can be made by coagulation or spinning known in the art. Generally, a viscous solution of the polyaniline is forced through a spinerette into a liquid-containing, coagulating bath. The coagulating bath generally contains a non-solvent for the polymer, such that the polymer precipitates from solution as its solvent diffuses outward into the non-solvent. Useful non-solvents for coagulating baths include water and aqueous solutions of protonic acids such as hydrochloric acid. When the coagulating bath is acidic, the resulting fibers are doped. Thus, by adjusting the acidity of the bath one can conveniently adjust the degree of conductivity of the final fiber.

It has also been found that a coagulating bath comprising a mixture of solvent and non-solvent for the polyaniline may be utilized. For example, the coagulating bath can contain a mixture of NMP (solvent) and water or aqueous HCl (non-solvents) to effect a slower, more controlled precipitation of the polyaniline. Generally, in such solvent/non-solvent mixtures, the solvent can constitute from up to about 30% w/w of the coagulating bath, the ideal amount depending, of course, on the specifics of the spinning or coagulation process. Fibers prepared in non-acidic baths containing, for example, water or mixtures of water and NMP are prepared in base form, and generally have a conductivity of less than about $10^{-10}$ S/cm. These fibers can be rendered electrically conductive when chemically or electrochemically doped according to known methods. See, for example, the disclosures of U.S. Pat. Nos. 4,204,216, 4,222,903, 4,321,114, 4,442,187, and U.S. Pat. No. 5,147,913, the disclosures of which are hereby incorporated by reference.

Composite fibers may be prepared using the polyaniline bases of this invention. Core fibers including but not limited to glass, nylon or polypropylene fibers can be coated with a solution of the polyaniline base and subjected to conditions under which the solvent is removed from the polyaniline solution. For example, the coated fiber could be placed in a coagulating bath, as described above. Optionally, the coated fiber might be stretched while in the coagulating bath to effect simultaneous orientation of the core fiber and the polyaniline coating.

Non-conductive high molecular weight polyaniline base powders, films or other shaped articles may also be doped, as discussed, to render them electrically conductive. Conductive high molecular weight polyaniline fibers prepared according to this invention have a multitude of uses. For example, they can be woven into cloths having anti-static properties. Such cloths, or the fibers themselves, can be used as radar-absorbing materials. The fibers might be impregnated in non-conducting conventional plastics to impart mechanical strength and controlled conductivity for use, for example, in the construction of airplane fuselages. The fibers can also be used as electroactive materials in batteries.

The compositions of matter and processes of this invention are further illustrated in the following examples, which are not intended to be limiting of this invention.

EXAMPLE 1

Experimental Procedure

Experiments were conducted to determine the effect of the salt concentration and/or reaction temperature for the production of polyanilines. Two types of polyaniline polymers were prepared: unsubstituted polyaniline and poly(o-methoxyaniline). The synthesis of the polyaniline and the poly(o-methoxyaniline) were carried out under essentially the same general experimental conditions with modifications where appropriate. The potential of the reaction system was constantly measured using a potential profiling technique, described by Manohar and MacDiarmid, *Polyaniline: Pernigraniline, An Insoluble Intermediate in the Conventional Chemical Synthesis of Emeraldine*, Synthetic Metals, 41–43, 711–714 (1991) in which a platinum electrode and a SCE reference electrode in the reaction vessel measure the potential changes throughout the reaction.

The molecular weight of the aniline polymers was determined using a 300×7.8 mm ID Ultrastyragel linear gel permeation chromatography column (Waters/Millipore Co.) with an effective molecular weight range from 2,000 to 4,000,000. The GPC column and detector were maintained at 35° C. and 30° C., respectively. The mobile phase was 0.5% wt./vol. LiCl in NMP with a flow rate of 0.44 ml/min. The polystyrene standards (Waters) used for calibration covered a molecular weight range of from 3,250 to 2,950,000. The standard solutions were prepared by dissolving 5 mg of the polystyrene in 10 ml of the 0.5% LiCl/NMP solvent and stirred for about 30 minutes. The aniline polymer samples were prepared in the same manner; with stirring continued for about 16 hours. Both standard and sample solutions were filtered through a 0.5 μm micropore syringe prior to injection. Single modal molecular weight distribution curves were obtained for the aniline polymers A. Preparation of Polyaniline—Unsubstituted Various concentrations of different salts were used in the reaction media during synthesis of polyaniline. The salts and their concentrations are shown in Table 1 along with the corresponding molecular weight of the polyaniline produced by the synthesis.

i. Reaction temperature of about 0°–3° C.

A 1M HCl solution was prepared and to this was added the requisite amount of salt to obtain the molar concentration set forth in Table 1. Aniline (0.054 mole, 5 ml) was dissolved into 75 ml of the salt/1M HCl solution which was then cooled to the reaction temperature using an ice bath. Ammonium peroxydisulfate (0.0126 mole, 2.875 g) was dissolved in the remaining 50 ml salt/1M HCl solution and cooled to the reaction temperature using an ice bath. The aniline and ammonium peroxydisulfate solutions were then mixed with constant stirring for about one minute. The reaction was continued until the open circuit potential, Voc, reached a value of about 0.43 V. An intense blue-green precipitate with a coppery glint was formed in each reaction. The precipitate was collected on a Buchner funnel (9 cm diameter; Whatman no. 4 filter paper) using a water aspirator. The precipitate was washed approximately 10 times with 1.0M HCl (80 ml portions) until the filtrate became colorless. The as synthesized emeraldine hydrochloride was partially dried during 15 minutes by pulling air through the filter cake in the Buchner funnel and a portion of this precipitate was then transferred to a petri dish and was dried during 24 hours in a desiccator under dynamic vacuum. The other portion of the precipitate was deprotonated by stirring in 500 ml 0.1M ammonium hydroxide ($NH_4OH$) for 48 hours. This precipitate was then filtered in a Buchner funnel by a water aspirator and was then transferred to a petri dish and was dried at room temperature in a desiccator under dynamic vacuum for about 24 hours. The emeraldine base fractions dried as described were used for the molecular weight determinations in Table 1.

ii. Reaction temperature of about −40° C.

Synthesis of unsubstituted polyaniline was also carried out at −40° C. in the presence of 5.8M lithium chloride. The reactants were supplied in the same quantities as in section A.i. for the reaction of the unsubstituted polyanaline at about 0° C., except for the additional lithium chloride salt. The solutions of the aniline and ammonium peroxydisulfate were placed in two glass troughs containing dry-ice/acetone (−78° C.) and cooled to about −50° C. with vigorous stirring. The ammonium peroxydisulfate solution was then poured into the aniline solution with constant magnetic stirring, the addition taking about one minute. After about ten minutes the stirring was interrupted and the reaction mixture was covered with paraffin film and held at about 48 hours at −40° C. in a refrigerator. The filtering, washing and drying of the resultant product was carried out using the procedures described in section A.i. A portion of the polymer powder product was further dried under dynamic vacuum for 48 hours at room temperature and for an additional 6 hours at about 80° C. and then used for a carbon, hydrogen and nitrogen analysis. The analysis found 78.53% carbon; 5.7% hydrogen; 15.77% nitrogen.

TABLE 1

Synthesis of Polyaniline

| Salt | Time to reach Vcc = 0.43V (hours)[a] | $M_w$ | $M_n$ | $M_w/M_n$ |
|---|---|---|---|---|
| No Salt | 1.5 | 53,000 | 25,000 | 2.06 |
| LiCl | | | | |
| 0.5M | 2.0 | 68,800 | 28,700 | 2.40 |
| 2.0M | 3.0 | 121,300 | 41,400 | 2.93 |
| 5.8M[e] | 20.0 | 218,100 | 59,600 | 3.66 |
| 5.8M[b,c] | 48 | 384,900 | 108,100 | 3.56 |
| 8.0M[c] | 48 | 213,200 | 68,500 | 3.11 |
| 10.0M[e] | 55 | 85,600 | 34,500 | 2.48 |
| $CaCl_2$ | | | | |
| 2.0M | 3.0 | 100,400 | 34,400 | 2.92 |
| 3.0M | 6.0 | 169,100 | 61,800 | 2.74 |
| 6.8M | 18.0 | 93,800 | 36,600 | 2.56 |
| $LiNO_3$ | | | | |
| 6.8M[d] | 22.0 | 146,700 | 45,900 | 3.20 |
| NaCl | | | | |
| 2.0M | 2.5 | 82,500 | 30,000 | 2.75 |
| LiF | | | | |
| 2.0M | 2.0 | 36,900 | 15,700 | 2.36 |

[a]volts vs. SCE
[b]Synthesis carried out at −40° C. as described in A.ii.

TABLE 1-continued

Synthesis of Polyaniline

| Salt | Time to reach Vcc = 0.43V (hours)[a] | $M_w$ | $M_n$ | $M_w/M_n$ |
|---|---|---|---|---|

[c]Voc not measured, reaction run for time indicated
[d]Elemental analysis of emeraldine base dried as described in A.i. found 77.3% C; 5.6% H; 15.19% N; calculated 79.53% C; 5.01% H; 15.46% N.
[e]Transmission FT/IR major peaks (KBr pellet) observed were as follows (units $cm^{-1}$): 3443, 3211, 2966, 1586, 1481, 1380, 1293, 1141, 953, 823.

B. Production of Poly(o-methoxyaniline)

The synthesis of poly(o-methoxyaniline) was performed using lithium chloride salt at various reaction conditions. The results of the experiments are shown in Table 2.

i. Reaction temperature of about 0°–3° C.

O-methoxyaniline, o-$(CH_3O)C_6H_4NH_2$ (6.74 ml, 0.0548 mole), was dissolved in 75 ml of 1.0M HCl and 5.8M LiCl and was then cooled with stirring to about 0°–3° C. in an ice bath to produce a homogeneous solution. Ammonium peroxydisulfate (2.875 g; 0.0126 mole) was dissolved in 50 ml of 1.0M HCl and 5.8M LiCl, cooled to about 0°–3° C. and then added to the o-methoxyaniline solution with constant stirring during about 1 minute. The reactant molar ratios used were: 1.00: 4.3: 9.9 for $(NH_4)_2S_2O_8$, aniline and HCl, respectively.

Polymerization was complete after approximately 2.0 hours between 0° to 3° C. as judged by the fact that after this time the Voc was essentially constant at a value of about 0.34 V. After collecting the precipitate on the Buchner funnel, it was washed with twenty 80 ml portions of acetone instead of with aqueous HCl as was done for the unsubstituted polyaniline. At this stage the filtrate was colorless. The residual traces of ammonium sulfate and ammonium peroxydisulfate in the precipitate were removed during the aqueous basification step which was identical to that used in the basification procedure for the polyaniline described above in section 1.A.i. The poly(o-methoxyaniline) base powder used for the molecular weight studies was dried under dynamic vacuum for about 24 hours at room temperature.

Polymethoxyaniline was also prepared under these conditions in the absence of added salt as a control.

ii. Effect of Reactant Concentration on Molecular Weight

The synthesis in the presence of 5.8M LiCl at about 0° C. to 3° C. was carried out exactly as described in 1.B.i using the same relative molar ratio of o-methoxyaniline and $(NH_4)_2S_2O_8$, i.e. 4.3:1.0, except that the absolute concentrations of each of these species in 1.0M HCl was only 25% of that used above. Thus the quantities used were: o-methoxyaniline (6.74 ml) in 300 ml of 5.8M LiCl/1.0M HCl solution and $(NH_4)_2S_2O_8$ (2.875 g) in 200 ml of 5.8M LiCl/1.0M HCl. No precipitate formed upon addition of the o-methoxyaniline to the 5.8M LiCl/1.0M HCl solution which was homogeneous even at reaction temperature. The filtering, washing and drying procedures were carried out as described in section 1.B.i. above.

iii. Synthesis at Low Temperature

The synthesis of poly(o-methoxyaniline) in the presence of 5.8M LiCl at low temperature was carried out using the dilute monomer and oxidant solutions prepared as described in section 1.B.ii above. It should be noted that a white precipitate was formed in the o-methoxyaniline in 5.8M LiCl/1.0M HCl solution only after cooling below −10° C. The solution of o-(CH$_3$O)C$_6$H$_4$NH$_2$, 5.8M LiCl and 1.0M HCl in a 1 liter beaker and the solution of (NH$_4$)$_2$S$_2$O$_8$, 5.8M LiCl and 1.0M HCl in another 1 liter beaker, were placed in two glass troughs containing dry-ice/acetone (−78° C.) and cooled to about −50° C. with vigorous stirring. The temperature of the contents of each beaker were checked with a thermometer. The ammonium peroxidisulfate solution was poured, during about 1 minute, into the o-methoxyaniline solution with constant magnetic stirring. The beaker (1 l) containing the reaction mixture was placed in a 2 liter Dewar containing a dry-ice/acetone slush (−78° C.) and placed in a refrigerator at about 0° C. No further stirring was used. After 24 hours the reaction mixture was at −35° C., measured by a thermometer, the bulb of which rested on the bottom of the beaker. The reaction was terminated after 48 hours at which time the temperature was about −15° C.

Filtering, washing and drying were carried out exactly as described for the conventional synthesis of poly(o-methoxyaniline) given in section 1.B.i.

The poly(o-methoxyaniline) base powder used for molecular weight, spectroscopic and cyclic voltammetry studies was dried in exactly the same way as described in section 1.B.i. above. The polymer powder used for carbon, hydrogen and nitrogen analysis was further dried under dynamic vacuum for 48 hours at room temperature and for an additional 6 hours at 80° C. The analysis found 69.3% carbon 5.07% hydrogen, and 11.5% nitrogen, with calculated values of 69.71%, 5.39%, and 11.62%, respectively.

TABLE 2

Synthesis of poly(o-methoxyaniline).

| Conditions[a] | Time t reach Voc = 0.43 V[b] (hours) | $M_w$ | $M_n$ | $M_w/M_n$ |
|---|---|---|---|---|
| i | 2.0 | 30,800 | 18,100 | 1.71 |
| ii | 4.0 | 143,800 | 42,400 | 3.39 |
| iii | 20.0 | 221,300 | 56,700 | 3.90 |
| iv[c] | 48.0 | 417,200 | 99,000 | 4.20 |

[a]Conditions:
i- no salt condition (Section B.i.)
ii- LiCl 5.8M (Section B.i).
iii- LiCl 5.8M, diluting the concentration of o-methoxyaniline and ammonium peroxydisulfate (Section B.ii).
iv- LiCl 5.8M carried out at low temperature (Section B.iii).
[b]reaction time
[c]Reaction run for indicated time; time to Voc not measured.
FT/IR Spectrum: 3395, 2930, 1700, 1590, 1498, 1373, 1322, 1163, 954, 845.
Cyclic voltammogram obtained upon immersion into aq. 1M HCl gave peaks: $(E_{1/2})^I$ about 0.11 V; $(E_{1/2})^{II}$ about 0.63 V.

EXAMPLE 2

Preparation of Polyaniline (Emeraldine Base) with CO$_2$ in the Reaction Mixture A freshly prepared solution of aq. 1.0N HCl (1 L) was placed in roughly equal amounts in two 1 L beakers, Anhydrous (LiCl) (about 240 g; weighed in a triple beam balance) was added in roughly equal quantities to both beakers containing aq. 1.0N HCl. The resulting heterogenous mixtures were stirred with a thick glass rod until complete dissolution of the LiCl occurs (the dissolution was exothermic). The contents of both the beakers were poured backwards and forwards into each other until the solutions were thoroughly mixed. About 500 ml of the above solution was placed in a 1 L beaker which was placed in a trough containing dry ice. Acetone (about 150 ml) was poured gently into the trough and the resulting cooling bath (−75° C.) rapidly cooled the contents of the beaker to about room temperature over a period of about 4 minutes.

About 100 ml of the aqueous 1.0N HCl solution containing LiCl was placed in a about 150 ml beaker and cooled to about room temperature using a dry-ice/acetone bath. Ammonium peroxydisulfate (2.3163 g) was added to the above solution and gently stirred until complete dissolution occurred.

To the aniline solution was added in small amounts (about 10 g quantities), freshly powered dry ice (crushed fresh from solid blocks of CO$_2$) while the solution was stirred manually with a plastic spatula. A rather vigorous manual stirring was required during this process. Upon addition of dry-ice, the temperature in the beaker dropped rapidly to about −8° C., when a milky white precipitate was observed. Further addition of dry-ice, coupled with manual stirring, resulted in a formation of a milky-white, viscous but free-flowing slush at about −60° C. A similar slush was prepared for the ammonium peroxydisulfate solution. It is important to note that both the above solutions were free-flowing.

The contents of the beaker containing ammonium peroxydisulfate dry-ice slush were poured, all at once, into the beaker containing the aqueous aniline/dry-ice slush, while being vigorously stirred manually, with a glass rod. The resulting solution (temperature about −60° C.) was also milky white in appearance. The beaker containing the reaction mixture was placed in about a 2 L Dewar containing a dry-ice/ethanol slush (−72° C.). The beaker containing the reaction mixture fit almost exactly into the Dewar in a way that the spout of the beaker prevented the beaker from falling into the Dewar. The amount of the dry-ice/ethanol slush was then adjusted to just barely rise along the outside of the beaker. The entire Dewar (including the beaker) was then covered with three layers of stretched paraffin, and placed in a refrigerator.

After about 16 hours, the Dewar containing the reaction mixture was removed from the refrigerator and the paraffin was removed. The reaction mixture contained a milky white precipitate without any visual indication of a reaction. The contents of the beaker were stirred with a glass rod. The temperature of the reaction mixture was about −60° C. The beaker and the Dewar were again covered with stretched paraffin and placed in the refrigerator. After about 12 hours, (total reaction time about 28 hours), the Dewar was removed from the refrigerator and the beaker taken out of it. The beaker contained a greenish precipitate and the sides of the beaker was covered with greenish layer of in-situ deposited polyaniline. The temperature of the reaction mixture was about −24° C.

The reaction mixture was filtered in air through a buchner filter funnel connected to a water aspirator. The filtrate was colorless. The dark-green precipitate of emeraldine hydrochloride was washed with copious amounts of freshly prepared aqueous 1.0N HCl (30×30 ml) making sure that the precipitate cake was always immersed in the aqueous 1.0N HCl solution and never allowed to develop cracks, and then allowed to dry in air with the water aspirator on for about 10 minutes. The precipitate tended to stick together when pressed with a spatula. The precipitate was then placed in about a 1 L erlenmeyer flask containing a magnetic stir-bar, and a solution of aqueous 0.1N NH$_4$OH (about 1 L) poured directly into the beaker all the way to the top of the flask. Which was then covered with stretched paraffin, making sure there were no air bubbles trapped between the top of the flask and the stretched paraffin. The contents of the flask were stirred at room temperature for about 16 hours. The resulting bronze precipitate of emeraldine base was then filtered in air through a buchner filter funnel connected to a water aspirator and washed successively with aqueous 0.1N $NH_4OH$ (20×40 mL) and water (5×50 mL). The wet precipitate was then placed in about a 150 ml beaker and covered with paper towel (held to the sides of the beaker with a rubber band) and placed in a vacuum desiccator connected to a trap cooled with dry-ice/acetone (−78° C.) and pumped under dynamic vacuum. After about 18 hours, the vacuum desiccator was disconnected from the pump and the contents of the beaker exposed to atmospheric air. About 50 mg of the bronze powder was placed in a small sample tube and pumped under dynamic vacuum (<5 micron pressure) for about 72 hours at room temperature, and finally at about 90° C. for about 10 hours.

The transmission FT/IR major peaks (KBr pellet) observed are as follows (units $cm^{-1}$): 4000–450; 3020 (br, combination of N-H str. and c-H aromatic str.); 1582 (m, C=N str.); 1494 (s, C=C str.); 1377 (s); 1299 (w); 1142 (m); 955 (w); 825 (m, C-H aromatic bend); 643 (w).

The major electronic transitions observed from the absorbance electronic spectrum (UV/V is) with wavelength of 800–300 nm, solvent being NMP/0.5% LiCl are as follows: $\pi$—$\pi^*$ transition: 329.9 nm (3.76 eV), A=1.4558; excitonic transition: 680.4 nm (1.82 eV), A=1.5089.

The cyclic voltammogram obtained upon immersion of the polyaniline into aqueous 1N HCl, powder placed directly on Pt mesh, Pt counter electrode, SCE reference and a scan rate of 50 mV/s gave two sets of redox peaks: $(E_{1/2})^I$ about 0.11 V; $(E_{1/2})^{II}$ about 0.74 V.

The molecular weight of the polyaniline was determined by filtering a solution of the base form in a NMP/0.5% LiCl eluent into a gel permeation chromatograph column at a flow rate of 0.22 ml/min. using narrow polystyrene standards calibration. A single modal distribution of molecular weight was observed having $M_w$ of about 307,156; $M_n$ of about 95,995; $M_p$ of about 282,927.

EXAMPLE 3

Preparation of Polyaniline (Emeraldine Base) Without $CO_2$ in the Reaction Mixture A freshly prepared solution of aq. 1.0N HCl (1 L) was placed in roughly equal amounts in two 1 L beakers. Anhydrous LiCl (approximately 240 g; weighed in a triple beam balance) was added in roughly equal quantities to both the beakers containing aq. 1.0N HCl. The resulting heterogenous mixtures were stirred with a thick glass rod until complete dissolution of the LiCl occurs (the dissolution was exothermic). The contents of both the beakers were poured backwards and forwards into each other until the solutions were thoroughly mixed. Approximately 500 ml of the above solution was placed in a 1 L beaker which was placed in a trough containing dry ice. Acetone (approximately 150 ml) was poured gently into the trough and the resulting cooling bath (−75° C.) rapidly cooled the contents of the beaker to about room temperature over a period of about 4 minutes.

About 300 ml of the above solution was placed in a clean 1 L beaker and to it, was added, all at once, via syringe, freshly distilled aniline (about 4 ml). A white precipitate was formed immediately upon addition of aniline. The solution was gently stirred with a glass rod until all of the precipitate dissolved.

About 100 ml of aq. 1.0N HCl solution containing LiCl was placed in about a 150 ml beaker and cooled to about room temperature using a dry-ice/acetone bath. Ammonium peroxydisulfate (2.3491 g) was added to the above solution and gently stirred until complete dissolution occurred.

The above two solutions containing aniline and ammonium peroxydisulfate were separately placed in two glass troughs containing dry-ice/acetone (−77° C.) and cooled to about −50° C. while being stirred vigorously with a glass rod. The beaker containing aniline was milky white in color. The contents of the beaker containing ammonium peroxydisulfate were poured, all at once, into the beaker containing aniline while being vigorously stirred manually, with a glass rod. The resulting solution was also milky white in appearance. The beaker containing the reaction mixture was placed in about a 2 L Dewar containing a dry-ice/ethanol slush (−72° C.). The beaker containing the reaction mixture fit almost exactly into the Dewar in such a way that the spout of the beaker prevented the beaker from falling into the Dewar. The amount of the dry-ice/ethanol slush was then adjusted to just barely rise along the outside of the beaker. The Dewar (including the beaker) was then covered with three layers of stretched paraffin, and placed in refrigerator.

After about 16 hours the Dewar containing the reaction mixture was removed from the refrigerator and the stretched paraffin was removed. The reaction mixture contained a milky white precipitate with a faintly bluish hue. The contents of the beaker were stirred with a glass rod. The temperature of the reaction mixture was about −49° C. The beaker and the Dewar were again covered with stretched paraffin and placed in the refrigerator. After about 12 hours (total reaction time about 28 hours), the Dewar was removed from the refrigerator and the beaker gently lifted out of it. The beaker contained a greenish precipitate and the sides of the beaker was covered with greenish precipitate and the sides of the beaker was covered with greenish layer of in-situ deposited polyaniline. The temperature of the reaction mixture was about −10° C.

The reaction mixture was filtered in air, through a buchner filter funnel connected to a water aspirator. The filtrate was colorless. The dark-green precipitate was washed with copious amounts of freshly prepared aq. 1.0N HCl (30×30 mL) (making sure that the precipitate cake was always immersed in the aq. 1.0N HCl solution and never allowed to develop cracks) and then allowed to dry in air with the water aspirator on for about 10 minutes. The precipitate of emeraldine hydrochloride tended to stick together when pressed with a spatula. The precipitate was then placed in about a 1 L erlenmeyer flask containing a magnetic stir-bar and a solution of aq. 0.1N $NH_4OH$ (about 1 L) poured directly into the beaker all the way to the top of the flask which was then covered with stretched paraffin making sure there were no air bubbles trapped between the top of the flask and the stretched paraffin. The contents of the flask were stirred at about room temperature for about 16 hours. The resulting bronze precipitate of emeraldine base was then filtered in air, through a buchner filter funnel connected to a water aspirator and washed successively with aq. 0.1N $NH_4OH$ (20× 40 mL) and water (5×50 mL). The wet precipitate was then placed in about a 150 mL beaker and covered with paper towel (held to the side of the beaker with a rubber band) and placed in a vacuum desiccator connected to a trap cooled with dry-ice/acetone (−78° C.) and pumped under dynamic vacuum. After about 18 h, the vacuum desiccator was disconnected from the pump and the contents of the beaker exposed to atmospheric air. About 50 mg of the bronze powder was placed in a small sample tube and pumped under dynamic vacuum (<5 micron pressure) for about 72 hours at about room temperature and finally at about 90° C. for about 10 hours.

The transmission FT/IR major peaks (KBr pellet) observed are as follows (units $cm^{-1}$): 4000–450; 3020 (br, combination of N-H str. and C-H aromatic str.); 1582 (m, C=N str.); 1494 (s, C=C str.); 1377 (s); 1299 (w); 1142 (m); 955 (w); 825 (m, C-H aromatic bend); 643 (w).

The major electronic transitions observed from the absorbance electronic spectrum (UV/Vis) with wavelength of 800–300 nm, solvent being NMP/0.5% LiCl are as follows: $\pi$—$\pi^*$ transition: 331.3 nm (3.74 eV), A=1.2988; excitonic transition: 682.5 nm (1.82 eV), A-1.3639.

The cyclic voltammogram obtained upon immersion of the polyaniline into aqueous 1N HCl, powder placed directly on Pt mesh, Pt counter electrode, SCE reference and a scan rate of 50 mV/s gave two sets of redox peaks: $(E_{1/2})^I$ about 0.14 V; $(E_{1/2})^{II}$ about 0.72 V.

The molecular weight of the polyaniline was determined by filtering a solution of the base form in a NMP/0.5% LiCl eluent into a gel permeation chromatograph column at a flow rate of 0.22 ml/min. using narrow polystyrene standards calibration. A single modal distribution of molecular weight was observed having $M_w$ of about 439,339; $M_n$ of about 119,203; $M_p$ of about 311,832.

Those skilled in the art will appreciate that numerous changes and modifications may be made to the preferred embodiments of the invention and that such changes and modifications may be made without departing from the spirit of the invention. It is therefore intended that the appended claims cover all such equivalent variations as fall within the true spirit and scope of the invention.

What is claimed is:

1. A method for preparing polyaniline, comprising the steps of:
   providing a first aqueous solution comprising aniline, protonic acid, and salt;
   providing a second aqueous solution comprising protonic acid, polymerization agent capable of causing polymerization of aniline, and salt;
   mixing said first solution and said second solution at a temperature above −10° C. to form a polymerization product comprising polyaniline; and
   recovering said polymerization product,
   wherein said salts are independently selected from sodium, lithium, potassium, magnesium, copper, ammonium, and calcium salts and are present in a concentration of from about 1 to about 8 moles/liter.

2. The method of claim 1 wherein the mixing step is conducted at a temperature below about 22° C.

3. The method of claim 2 wherein the mixing step is conducted at a temperature below about 10° C.

4. The method of claim 1 wherein the salt is present in a concentration of from about 1–6 moles/liter.

5. The method of claim 1 wherein the protonic acid and the salt have a common anionic moiety.

6. The method of claim 1 wherein the protonic acid comprises HCl, $H_2SO_4$, or combinations thereof.

7. The method of claim 1 wherein the salt comprises sodium chloride, lithium chloride, calcium chloride, ammonium sulfate, or combinations thereof.

8. The method of claim 7 wherein the salt concentration in the reaction media is from about 1 to about 6 moles/liter.

9. The method of claim 7 wherein the salt concentration in the reaction media is from about 3 to about 6 moles/liter.

10. The method of claim 1 wherein said aniline has the structure:

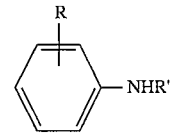

wherein R and R' are, independently, H, alkyl or alkoxyl having from about 1 to about 6 carbon atoms.

11. A method for preparing polyaniline, comprising the steps of:
   mixing aniline, protonic acid, polymerization agent capable of causing polymerization of aniline, and salt, wherein said mixing is effected in aqueous media to form a polymerization product comprising polyaniline, wherein the aqueous media is at a temperature of from −10° C. to about 22° C.; and recovering the resultant polymerization product, wherein said salts are independently selected from sodium, lithium, potassium, magnesium, copper, ammonium, and calcium salts and are present in a concentration of from about 1 to about 10 moles/liter.

12. The method of claim 11 wherein said aniline has the structure:

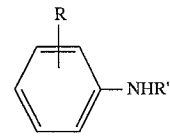

wherein R and R' are, independently, H, alkyl or alkoxyl having from about 1 to about 6 carbon atoms.

13. The method of claim 12 wherein R is 2-ethoxyl.

14. The method of claim 12 wherein the protonic acid is HCl, HBr, HI, $H_3PO_3$, $H_2SO_4$, $HClO_4$, $CH_3CO_2H$, or combinations thereof, and wherein the salt comprises sodium chloride, lithium chloride, calcium chloride, ammonium sulfate, or combinations thereof.

15. The method of claim 14 wherein the salt is present in a concentration of from about 1–6 moles/liter.

16. The method of claim 12 wherein the protonic acid comprises hydrochloric acid.

17. The method of claim 11 wherein the salt is present in a concentration of from about 1–6 moles/liter.

* * * * *